United States Patent [19]

Dixon et al.

[11] Patent Number: 4,879,723
[45] Date of Patent: Nov. 7, 1989

[54] INTRACAVITY GENERATION OF COHERENT OPTICAL RADIATION OF OPTICAL MIXING

[75] Inventors: George J. Dixon, Lutz, Fla.; Douglas W. Anthon; John H. Clark, both of Wheaton, Ill.

[73] Assignee: Amoco Corporation, Chicago, Ill.

[21] Appl. No.: 78,373

[22] Filed: Jul. 27, 1987

[51] Int. Cl.⁴ ............................................. H01S 3/10
[52] U.S. Cl. ................................... 372/21; 307/425; 372/75
[58] Field of Search .................. 307/425, 427, 424; 372/4, 5, 20, 21, 22, 23, 75, 92

[56] References Cited

U.S. PATENT DOCUMENTS

| | | | |
|---|---|---|---|
| 3,646,358 | 2/1972 | Firester | 307/425 |
| 3,983,406 | 9/1976 | Lak et al. | 307/425 |
| 3,984,675 | 10/1976 | Corcoran et al. | 307/425 |
| 4,656,635 | 4/1987 | Baer et al. | 372/27 |
| 4,717,842 | 1/1988 | Komine | 307/426 |
| 4,791,631 | 12/1988 | Baumert et al. | 372/22 |

OTHER PUBLICATIONS

R. D. Dupuis; "An Introduction to the Development of the Semiconductor Laser"; IEEE J. Quantum Electron., vol. QE-23, No. 6, pp. 651-657, (1987).

J. E. Ripper et al., "Optical Coupling of Adjacent Stripe-Geometry Junction Lasers"; Appl. Phys. Lett., 17, 371, (1970).

Ammann; "Simultaneous Stimulated Raman Scattering and Optical Frequency Mixing In Lithium Iodate"; Appl. Phys. Lett. 34(12), Jun. 15, 1979; pp. 838-840.

Primary Examiner—William L. Sikes
Assistant Examiner—B. R. R. Holloway
Attorney, Agent, or Firm—Richard A. Kretchmer; William M. Magidson; Ralph C. Medhurst

[57] ABSTRACT

An efficient, compact source of coherent radiation in the infrared, visible and ultraviolet portion of the spectrum which is capable of modulation rates over the range from 0 Hz to in excess of 1 GHz. The radiation is produced by optical mixing within the optical cavity of a laser by introducing input radiation into the optical cavity where: (a) the cavity is that of a diode-pumped solid state laser, and/or (b) input radiation is provided by a solid state device selected from the group consisting of laser diodes, laser diode arrays and diode-pumped solid state lasers.

45 Claims, 2 Drawing Sheets

INTRACAVITY GENERATION OF COHERENT OPTICAL RADIATION OF OPTICAL MIXING

FIELD OF THE INVENTION

This invention relates to the generation of a coherent optical radiation within the optical cavity of a laser by optical mixing. More particularly, it relates to the use of solid state components in such a process.

BACKGROUND OF THE INVENTION

A laser is a device which has the ability to produce monochromatic, coherent light through the stimulated emission of photons from atoms, molecules or ions of an active medium which have been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of identical energy from other excited atoms, molecules or ions. As a consequence, the initial photon creates a cascade of photons between the reflecting surfaces of the optical cavity which are of identical energy and exactly in phase. A portion of this cascade of photons is then discharged through one or more of the reflecting surfaces of the optical cavity.

Excitation of the active medium of a laser can be accomplished by a variety of methods. However, the most common methods are optical pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes, laser diodes and laser diode arrays to optically pump or excite a solid lasant material is well-known. Lasant materials commonly used in such solid state lasers include crystalline or glassy host materials into which an active material, such as trivalent neodymium ions, is incorporated. Detailed summaries of conventional crystalline lasant materials are set forth in the *CRC Handbook of Laser Science and Technology*, Vol. I, M. J. Weber, Ed., CRC Press, Inc., Boca Raton, Fla., 1982, pp. 72-135 and in *Laser Crystals*, Vol. 14 of the Springer Series in Optical Sciences, D. L. MacAdam, Ed., Springer-Verlag, New York, N.Y., 1981. Conventional host materials for neodymium ion include glass, yttrium aluminum garnet ($Y_3Al_5O_{12}$, referred to as YAG), $YAlO_3$ (referred to as YALO) and $LiYF_4$ (referred to as YLF). By way of example, when neodymium-doped YAG is employed as the lasant material in an optically pumped solid state laser, it is typically pumped by absorption of light having a wavelength of about 808 nm and emits light having a wavelength of 1,064 nm.

U.S. Pat. No. 3,624,545 issued to Ross on Nov. 30, 1971, describes an optically pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on Sept. 21, 1976. Finally, D. L. Sipes, *Appl. Phys. Lett.*, Vol. 47, No. 2, 1985, pp. 74-75, has reported that the use of a tightly focused semiconductor laser diode array to end pump a neodymium-doped YAG results in a high efficiency conversion of pumping radiation having a wavelength of 810 nm to output radiation having a wavelength of 1,064 nm.

Materials having nonlinear optical properties are well-known. For example, U.S. Pat. No. 3,949,323 issued to Bierlen et al. on Apr. 6, 1976, discloses that nonlinear optical properties are possessed by materials having the formula $MTiO(XO_4)$ where M is at least one of K, Rb, Tl and $NH_4$; and X is at least one of P or As, except when $NH_4$ is present then X is only P. This generic formula includes potassium titanyl phosphate, $KTiOPO_4$, a particularly useful nonlinear material. Other known nonlinear optical materials include, but are not limited to, $KH_2PO_4$, $LiNbO_3$, $KNbO_3$, $\beta$-$BaB_2O_4$, $Ba_2NaNb_5O_{15}$, $LiIO_3$, $HIO_3$, $KB_5O_8 \cdot 4H_2O$, potassium lithium niobate and urea. A review of the nonlinear optical properties of a number of different uniaxial crystals has been published in *Sov. J. Quantum Electron.*, Vol. 7, No. 1, January 1977, pp. 1-13. Nonlinear optical materials have also been reviewed by S. Singh in the *CRC Handbook of Laser Science and Technology*, Vol. III, M. J. Weber, Ed., CRC Press, Inc., Boca Raton, Fla., 1986, pp. 3-228.

The nonlinear nature of the optical susceptibility of nonlinear optical materials provides a coupling mechanism between electromagnetic waves that simultaneously pass through the material and can be used to generate radiation by the interaction of these waves. As used in this application, the term "optical mixing" refers to the interaction within a nonlinear optical material of two beams of light having frequencies $w_1$ and $w_2$ to produce optical radiation of a different frequency. For example, where $w_1$ is greater than $w_2$, this interaction can produce optical radiation at the sum-frequency, $w_3 = w_1 + w_2$, and at the difference-frequency, $w_4 = w_1 - w_2$. These two processes are referred to as sum-frequency generation and difference-frequency generation, respectively. Up-conversion refers to the special case of sum-frequency generation where radiation of one frequency, for example $w_1$, is much more intense than that at $w_2$ and, accordingly, does not undergo any appreciable change in amplitude as optical mixing occurs to give optical radiation of wavelength $w_3$. Optical mixing also includes higher order processes such as $w_5 = w_1 + 2w_2$ and $w_6 = 2w_1 - 2w_2$. For the purposes of this application, the optical radiation produced by optical mixing is generically referred to as "optical mixing radiation."

Efficient optical mixing within a nonlinear optical material is not usually possible unless the wave vectors, $k_1$, $k_2$ and $k_3$, of the interacting waves satisfy the momentum conservation equation or phase-matching condition that requires $$k_3 = k_1 + k_2$$

Satisfying this phase-matching requirement is not possible in isotropic crystals with normal dispersion because the refractive indices of the three different waves will necessarily be different as a consequence of dispersion. However, many nonlinear optical materials possess an anisotropy of refractive index which can be utilized to satisfy the phase-matching condition for a desired type of optical mixing.

The up-conversion of infrared radiation to the visible and ultraviolet range has been extensively studied. Such studies have been primarily motivated by an interest in using this technique to permit the detection and analysis of infrared radiation by the conventional and efficient methods that are available for light of higher frequency. Since the up-converted radiation carries essentially all of the information of the input infrared radiation, potential applications include infrared signal detection, infrared spectral analysis and infrared holography.

Up-conversion of infrared radiation has been reviewed by E. S. Voronin et al., *Sov. Phys. Usp.*, Vol. 22, No. 1, pp. 26–45 (January 1979) and J. Warner, "Difference Frequency Generation and Up-Conversion" in *Quantum Electronics*, Vol. I, Nonlinear Optics, Part B, H. Rabin and C. L. Tang, Ed., Academic Press, New York, pp. 703–737 (1975). A theoretical discussion of infrared detection by sum-frequency generation has also been published by D. A. Kleinman et al., *J. Appl. Phys.*, Vol. 40, No. 2, pp. 546–566 (February 1969).

At page 34 of their previously-cited review article, E. S. Veronin et al. describe the up-conversion of infrared radiation from a $CO_2$ laser within the cavity of a YAG:$Nd^{3+}$ laser using proustite as the nonlinear optical material. In addition, E. Liu et al., *Applied Optics*, Vol. 21, No. 19, pp. 3415–3416 (1 Oct. 1982) have reported the generation of radiation at wavelengths in the range from 252 nm to 268 nm by intracavity sum-frequency generation in a 90° phase-matched temperature-tuned ammonium dihydrogen phosphate crystal, of selected output lines from an argon ion laser and the traveling wave in a rhodamine 110 ring dye laser. Further, U.S. Pat. No. 3,646,358, issued to Firester on Feb. 29, 1972 discloses the up-conversion of signal radiation from an external source within the cavity of a laser wherein the polarization of the signal beam is orthogonal to that of the pump beam which is generated within the laser cavity. The prior art has not, however, suggested the possibility of using the cavity of a diode-pumped solid state laser for sum-frequency generation or the use of radiation from a laser diode, laser diode array or diode-pumped solid state laser for sum-frequency generation.

Difference-frequency generation has been reviewed in the above-cited review article in *Quantum Electronics*, Vol. I, at pp. 735–736 and by R. L. Aggarwal et al. in *Nonlinear Infrared Generation*, Y.-R. Shen, Ed., Springer-Verlag, Berlin, pp. 19–38 (1977).

There is a current need for efficient, compact and reliable lasers which operate in the infrared, visible and ultraviolet portion of the spectrum and are capable of modulation rates over the range from 0 Hz to in excess of 1 GHz over a wide range of intensities. Such devices would be useful for applications which include optical storage of data, reprographics, spectroscopy and communications. For example, the storage of data on optical disks requires a source of coherent radiation which can be modulated at a rate between about 5 and about 20 MHz, and such radiation is desirably in the visible or ultraviolet portion of the spectrum in order to maximize data storage within a given area. In addition, compact coherent sources of red, green and blue light would be highly attractive for television applications requiring a high brightness source. The use of three such lasers in place of the red, green and blue electron guns of a conventional television picture tube would result in a high brightness television projector that would be useful in simulation systems and large screen television systems. Laser diodes possess all of the above-described capabilities except for one - their output is in a limited part of the infrared portion of the electromagnetic spectrum at wavelengths in the range from about 750 nm to about 1600 nm.

SUMMARY OF THE INVENTION

The present invention is directed to an efficient, compact and reliable laser which can be operated in the infrared, visible and ultraviolet portion of the spectrum and is capable of modulation rates over the range from 0 Hz to in excess of 1 GHz.

We have discovered that coherent optical radiation (radiation in the infrared, visible and ultraviolet regions of the spectrum) can be produced by intracavity optical mixing using solid state components. More specifically, we have found that optical mixing can be carried out within the optical cavity of a laser by introducing input radiation into the optical cavity where: (a) the cavity is that of a diode-pumped solid state laser, and/or (b) input radiation is provided by a solid state device selected from the group consisting of laser diodes, laser diode arrays and diode-pumped solid state lasers. Because the frequency of the optical mixing radiation is a function of the initial frequencies, the wavelength of the output radiation can be conveniently varied over much of the optical spectrum and all of its visible portion merely by using different laser diodes or laser diode arrays in combination with an efficient rare earth metal transition of a diode-pumped solid state laser. In addition, the resulting device substantially retains the efficiency, reliability and compact size of its solid state components.

One embodiment of the invention is a method for generating coherent optical radiation which comprises: (a) generating coherent optical radiation of a first frequency, $w_1$, from a lasant material which is contained within an optical cavity; (b) generating coherent optical radiation of a second frequency, $w_2$, from a source which is selected from the group consisting of laser diodes, laser diode arrays and diode-pumped solid state lasers; (c) introducing said radiation of a second frequency into said optical cavity; and (d) interacting said radiation of a first frequency and said radiation of a second frequency with a nonlinear optical material which is contained within the optical cavity to generate coherent optical radiation of a third frequency, $w_3$.

Another embodiment of the invention is a method for generating coherent optical radiation which comprises: (a) generating optical pumping radiation from a source which is selected from the group consisting of laser diodes, light-emitting diodes and laser diode arrays; (b) generating coherent optical radiation of a first frequency, $w_1$, by optically pumping a lasant material with said optical pumping radiation, wherein said lasant material is contained within an optical cavity; (c) generating coherent optical radiation of a second frequency, $w_2$; (d) introducing said radiation of a second frequency into said optical cavity; and (e) interacting said radiation of a first frequency and said radiation of a second frequency with a nonlinear optical material which is contained within the optical cavity to generate coherent optical radiation of a third frequency, $w_3$.

Another embodiment of the invention is an apparatus for generating coherent optical radiation which comprises: (a) means for generating coherent optical radiation of a first frequency, $w_1$, within an optical cavity; (b) means for generating coherent optical radiation of a second frequency, $w_2$, which is located outside of said optical cavity and is selected from the group consisting of laser diodes, laser diode arrays and diode-pumped solid state lasers; (c) means for introducing said radiation of a second frequency into said optical cavity; and (d) nonlinear optical means within said optical cavity which is positioned to interact with said radiation of a first frequency and said radiation of a second frequency to generate coherent optical radiation of a third frequency, $w_3$.

A further embodiment of the invention is an apparatus for generating coherent optical radiation which comprises: (a) optical pumping means for generating optical pumping radiation which is selected from the group consisting of laser diodes, light-emitting diodes and laser diode arrays; (b) lasant material which is contained within an optical cavity, positioned to receive pumping radiation from said optical pumping means and capable of producing coherent optical radiation of a first frequency, $w_1$, upon being pumped by the pumping radiation; (c) means for generating coherent optical radiation of a second frequency, $w_2$, which is located outside of said optical cavity; (d) means for introducing said radiation of a second frequency into said optical cavity; and (e) nonlinear optical means within said optical cavity which is positioned to interact with said radiation of a first frequency and said radiation of a second frequency to generate coherent optical radiation of a third frequency, $w_3$.

An object of the invention is to provide a solid state device for the generation of coherent radiation in the infrared, visible and ultraviolet portion of the spectrum.

Another object of the invention is to provide a compact source of coherent light in the infrared, visible and ultraviolet portion of the spectrum which is efficient and reliable.

Another object of the invention is to provide an easily modulated source of coherent radiation in the infrared, visible and ultraviolet portion of the spectrum.

Another object of the invention is to provide a solid state device for the generation of coherent optical radiation by optical mixing.

A further object of the invention is to provide an improved method for the production of coherent optical radiation by optical mixing.

A further object of the invention is to provide a method for the use of laser diodes and laser diode arrays in the production of coherent optical radiation by optical mixing.

A still further object of the invention is to provide a method for the use of a diode-pumped solid state laser in the production of coherent optical radiation by optical mixing.

DETAILED DESCRIPTION OF THE PREFERRED EMBODIMENTS

While this invention is susceptible of embodiment in many forms, there are schematically shown in FIGS. 1–4, four specific embodiments, with the understanding that the present disclosure is not intended to limit the invention to the embodiments illustrated.

Figure 1:
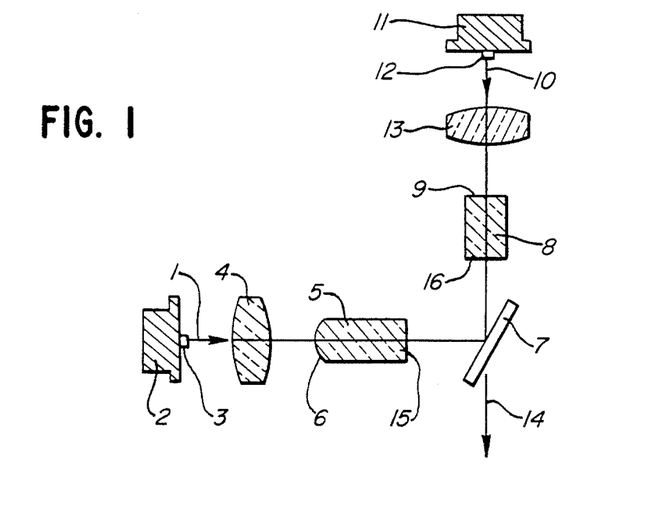
FIG. 1 of the drawings is a schematic representation of one embodiment of the invention.

With reference to FIG. 1, optical pumping radiation 1 from an optical pumping means represented by the combination of 2 and 3 is focused by lens 4 onto lasant material 5 which has a suitable reflective coating on surface 6 and is capable of being pumped by the light from said pumping means (2 and 3). Light emitted by the lasing of lasant material 5 is reflected off a suitable coating on 90-degree bending mirror 7 and through nonlinear optical material 8, which has a suitable reflective coating on surface 9. Laser action by lasant material 5 occurs in the resonator or optical cavity which is formed by the reflective coatings on mirror 7 and on surfaces 6 and 9. Coherent input radiation 10 from a radiation source represented by 35 the combination of 11 and 12 is focused by lens 13 onto surface 9 of nonlinear optical material 8 in such a manner that the overlap between input radiation 10 and radiation generated by the lasing of lasant material 5 (cavity radiation) is maximized. Nonlinear optical material 8 is phase-matched for the desired optical mixing process between input radiation 10 and the cavity radiation, for example, sum-frequency generation. The resulting optical mixing radiation is passed through 90-degree bending mirror 7 as output radiation 14.

Suitable optical pumping means (2 and 3) include, but are not limited to, laser diodes, light-emitting diodes (including superluminescent diodes and superluminescent diode arrays) and laser diode arrays, together with any ancillary packaging or structures. For the purposes hereof, the term "optical pumping means" includes any heat sink, thermoelectric cooler or packaging associated with said laser diodes, light-emitting diodes and laser diode arrays. For example, such devices are commonly attached to a heat resistant and conductive heat sink and are packaged in a metal housing. For efficient operation, the pumping radiation 1 emitted by the optical pumping means is desirably matched with a suitable absorption band of the lasant material 5. Although the invention is not to be so limited, a highly suitable optical pumping source consists of a gallium aluminum arsenide laser diode 3, which emits light having a wavelength of about 810 nm, that is attached to heat sink 2. Heat sink 2 can be passive in character. However, heat sink 2 can also comprise a thermoelectric cooler or other temperature regulation means to help maintain laser diode 3 at a constant temperature and thereby ensure optimal operation of laser diode 3 at a constant wavelength. It will be appreciated, of course, that during operation the optical pumping means will be attached to a suitable power supply. Electrical leads from laser diode 3, which are directed to a suitable power supply, are not illustrated in FIG. 1.

Lens 4 serves to focus light from laser diode 3 onto lasant material 5. This focusing results in a high pumping intensity and an associated high photon to photon conversion efficiency in lasant material 5. Any conventional optical means for focusing light can be used in place of simple lens 4. For example, a gradient index lens, a ball lens, an aspheric lens or a combination of lenses can be utilized. It will be appreciated, however, that lens 4 is not essential to the practice of this invention and the use of such focusing means merely represents a preferred embodiment.

Any conventional lasant material 5 can be utilized provided that it is capable of being optically pumped by the optical pumping means selected. Suitable lasant materials include, but are not limited to, solids selected from the group consisting of glassy and crystalline host materials which are doped with an active material. Highly suitable active materials include, but are not limited to, ions of chromium, titanium and the rare earth metals. Highly suitable lasant materials include neodymium-doped YAG, neodymium-doped YALO and neodymium-doped YLF. By way of specific example, neodymium-doped YAG is a highly suitable lasant material 5 for use in combination with an optical pumping means which produces light having a wavelength of about 810 nm. When pumped with light of this wavelength, neodymium-doped YAG can emit light having a wavelength of 1,064 nm.

In FIG. 1, lasant material 5 is shown with a convex input surface 6. This convex surface serves to improve the resonator stability and also serves to create an output beam from lasant material 5 which has an optimized waist for efficient optical mixing within nonlinear optical material 8. However, convex input surface 6 is not necessary. The precise geometric shape of lasant material 5 can vary widely. For example, lasant material 5 can be rod-shaped or rhombohedral in shape if desired, and lens-shaped surfaces can be used if desired. Indeed, one embodiment of the invention involves the use of a fiber of lasant material which is end-pumped by the optical pumping means. Highly suitable fibers for this purpose include, but are not limited to, glass optical fibers which are doped with ions of a rare earth metal such as neodymium. The length of such a fiber is easily adjusted to result in absorption of essentially all of the light from the optical pumping means. If a very long fiber is required, it can be coiled, on a spool for example, in order to minimize the overall length of the laser of this invention.

Light emitted by the lasing of lasant material 5 is passed into nonlinear optical material 8 where it interacts with coherent radiation 10 from radiation source 11 and 12. By means of proper orientation of the crystal structure of the nonlinear optical material 8 with respect to the optical path of the interacting optical radiation (referred to as phase-matching), efficient optical mixing of the desired type occurs. In addition, phase-matching can be optimized and controlled by adjustment and control of the temperature of the nonlinear optical material. By way of specific example, infrared radiation having a wavelength of 1064 nm from a neodymium-doped YAG lasant material 5 can be combined in nonlinear optical material 8 with light having a wavelength of 808 nm from radiation source 11 and 12 to produce by sum-frequency generation visible blue light having a wavelength of 459 nm. In this specific example, the nonlinear optical material 8 can be potassium titanyl phosphate with Type II noncritical phase matching (where theta and phi equal 90 degrees).

The geometric shape of nonlinear optical material 8 can vary widely. For example, it can be rod-shaped or rhombohedral in shape and can have lens-shaped surfaces if desired. It will also be appreciated that any such nonlinear optical component can comprise heating or cooling means to control the temperature of said nonlinear optical material and thereby optimize the phase-matching. Noncritical phase-matching is usually preferred when possible due to elimination of walk-off.

Potassium titanyl phosphate, $KTiOPO_4$, is a highly preferred nonlinear optical material. However, it will be appreciated that any nonlinear optical material can be utilized in the practice of this invention. Suitable nonlinear optical materials include, but are not limited to, $KH_2PO_4$, $LiNbO_3$, $KNbO_3$, $\beta$-$BaB_2O_4$, $Ba_2NaNb_5O_{15}$, $LiIO_3$, $HIO_3$, $KB_5O_8 \cdot 4H_2O$, potassium lithium niobate, urea and compounds of the formula $MTiO(XO_4)$ where M is selected from the group consisting of K, Rb and Tl, and X is selected from the group consisting of P and As.

It will be appreciated, of course, that for radiation of two different frequencies, $w_1$ and $w_2$, the phase-matching conditions will ordinarily be different for each type of optical mixing process in a given nonlinear optical material. For example, where $w_1$ is greater than $w_2$, the phase-matching conditions for sum-frequency generation ($w_3 = w_1 + w_2$) will ordinarily be different from those for difference-frequency generation ($w_4 = w_1 - w_2$) since $w_3$ and $w_4$ are different. Indeed, satisfactory phase-matching conditions and optical transparency may exist for certain optical mixing processes but not others in a given nonlinear optical material. Accordingly, the desired optical mixing process can be obtained by control of the phase-matching conditions. The procedures and criteria for the selection and phase-matching of nonlinear optical materials for a given optical mixing process are conventional.

Lens 13 serves to focus input radiation 10 onto nonlinear optical material 8 in such a manner that the production of radiation by optical mixing is optimized. Any conventional optical means for focusing light can be used in place of simple lens 13. For example, a gradient index lens, a ball lens, an aspheric lens or a combination of lenses can be utilized. It will be appreciated, however, that lens 13 is not essential to the practice of this invention, and the use of such focusing means merely represents a preferred embodiment.

Radiation source 11 and 12 can be any source of coherent radiation. However, preferred radiation sources include laser diodes and laser diode arrays together with any ancillary packaging or structures. For example, such devices are commonly attached to a heat resistant and conductive heat sink and are packaged in a metal housing. A highly suitable radiation source consists of a gallium aluminum arsenide laser diode 12 which is attached to heat sink 11. Heat sink 11 can be passive in character. However, heat sink 11 can also comprise a thermoelectric cooler or other temperature regulation means to help maintain laser diode 12 at constant temperature and thereby ensure optimal operation of laser diode 12 at a single wavelength. It will be appreciated, of course, that during operation the optical pumping means will be attached to a suitable power supply. Electrical leads from laser diode 12, which are directed to a power supply, are not illustrated in FIG. 1.

Conventional laser diodes and laser diode arrays are available which produce output radiation having a wavelength over the range from about 750 nm to about 1600 nm, and any such device can be used in the practice of this invention as the source of input radiation 10. For example, GaAlAs devices can be used to provide radiation in the wavelength range from about 750 nm to about 900 nm, and InGaAsP devices can be used to provide radiation in the wavelength range from about 1000 nm to about 1600 nm. With such a range of wavelengths (750-1600 nm) used in combination with radiation from rare earth metal laser transitions in lasant material 5 (for example, 1319 nm and 1064 nm from neodymium transitions) output radiation 14 produced by sum-frequency generation can be varied over the range from about 440 nm to beyond 650 nm.

A laser diode or laser diode array typically can be tuned over a wavelength range of about 10 nm by adjusting and controlling its operating temperature. Accordingly, when such a device is used to provide input radiation 10, the optical mixing output radiation 14 can be tuned over a modest wavelength range by temperature tuning the laser diode or laser diode array. In view of this, a preferred embodiment of the invention involves tuning the wavelength of output radiation 14 by adjusting and controlling the temperature of the laser diode or laser diode array 12 which is used to provide input radiation 10. Alternatively, the laser diode or laser diode array can be tuned over a small range of wavelengths by varying the current which is applied to the device. Such tuning will, of course, usually require an adjustment to optimize the phase-matching conditions in nonlinear optical material 8. In noncritically phase-matched temperature tuned nonlinear optical materials, this can be easily accomplished by merely adjusting the temperature of the nonlinear optical material.

If desired, radiation source 11 and 12 can be a diode-pumped solid state laser. Suitable diode pumping means for such a laser include laser diodes, light-emitting diodes and laser diode arrays. In addition, the diode-pumped solid state laser can comprise any conventional solid lasant material which can be optically pumped by the selected diode pumping means. Although the invention is not to be so limited, a highly satisfactory diode-pumped solid state laser is a neodymium-doped YAG laser which is optically pumped by a laser diode array and is frequency-doubled using a potassium titanyl phosphate nonlinear optical component to produce output radiation having a wavelength of 532 nm. Such a device is described in U.S. Pat. No. 4,653,056 issued to Baer et al. on Mar. 24, 1987. The combination of such 532 nm radiation as input radiation 10 with radiation having a wavelength of 1319 nm from a neodymium-doped YAG lasant material 5 can be used to generate sum-frequency output radiation 14 which is in the near-ultraviolet portion of the spectrum at a wavelength of 379 nm.

The reflective coating on surface 6 of lasant material 5 is selected in such a manner that it is substantially transparent to optical pumping radiation 1 but highly reflective with respect to light emitted by the lasing of lasant material 5. The reflective coating on surface 9 of nonlinear optical material 8 is selected in such a manner that it is substantially transparent to input radiation 10 but highly reflective with respect to light emitted by the lasing of lasant material 5. Finally, the reflective coating on 90-degree bending mirror 7 is selected in such a manner that it is highly reflective for light emitted by the lasing of lasant material 5 but substantially transparent to output radiation 14 which is produced by optical mixing. The above-described coatings are conventional in character and can, for example, be dielectric coatings.

In a preferred embodiment of the invention, input radiation 10 and radiation produced by the lasing of lasant material 5 are both polarized and the polarizations adjusted in such a manner that the efficiency of optical mixing in nonlinear optical material 8 is optimized. For example, with sum-frequency generation, these polarizations should be orthogonal for Type II phase-matching and identical for Type I phase-matching. If unpolarized, the radiation produced by the lasing of lasant material 5 can be polarized by any conventional intracavity means. For example, a polarization-dependent coating can be applied to 90-degree bending mirror 7 or a Brewster plate can be used for this purpose. Alternatively, lasant material 5 can be selected in such a manner that it inherently produces polarized light upon lasing. For example, suitably oriented neodymium-doped YALO and YLF produce polarized light whereas neodymium-doped YAG does not.

Input radiation 10 can be polarized by any conventional means. For example, coherent radiation from conventional laser diodes and conventional multistripe laser diode arrays is inherently polarized. Accordingly, if such a device is used to provide input radiation 10 and radiation from lasant material 5 is polarized by intracavity polarizing means, then adjustment of the polarizations with respect to each other can be accomplished by either rotation of the diode device or rotation of the intracavity polarizing means.

Modulation of the optical mixing output radiation 14 can be easily accomplished by modulating input radiation 10. When a laser diode or laser diode array is used to provide input radiation, such modulation can be effected by modulation of the power supply to the laser diode or laser diode array. Conventional means are available for modulating the output from laser diodes and laser diode arrays over the range from 0 Hz to in excess of 1 GHz, and the use of all such modulation means represents a preferred embodiment of the invention. Alternatively, the optical mixing output radiation 14 can be modulated by modulating the light emitted by the lasing of lasant material 5 through conventional techniques such as Q-switching, gain-switching (by modulating optical pumping radiation 1) or modelocking.

Figure 3:
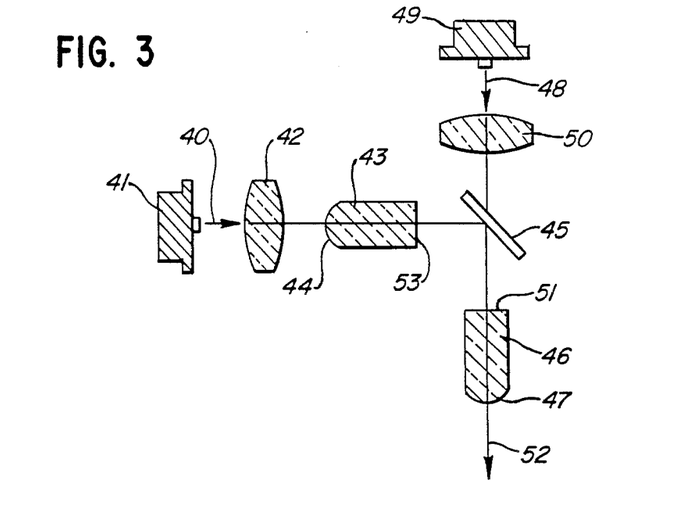
FIG. 3 of the drawings is a schematic representation of a third embodiment of the invention.
Figure 4:
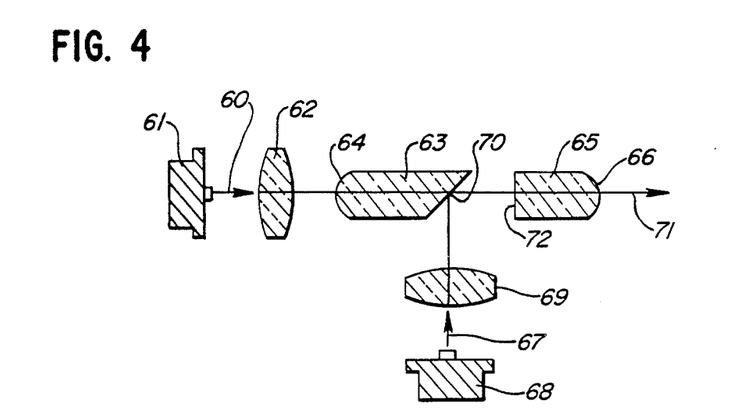
FIG. 4 of the drawings is a schematic representation of a fourth embodiment of the invention.

It will be appreciated that 90-degree bending mirror 7 is not an essential element of the invention. In the absence of 90-degree bending mirror 7, any convenient method can be utilized to: (a) combine input radiation 10 and radiation from lasant material 5 in nonlinear material 8, and (b) withdraw the radiation produced by optical mixing from the optical cavity defined by the reflective coatings on surfaces 6 and 9. For example, some of the many alternatives are illustrated in FIGS. 2-4 which are discussed below.

In a specific example of the embodiment illustrated in FIG. 1, neodymium-doped YLF is used as lasant material 5 and $KNbO_3$ is used as nonlinear optical material 8. The neodymium-doped YLF is optically pumped by a Model SDL 2420 multistripe laser diode array (manufactured by Spectra Diode Labs of San Jose, Calif.) 3 which generates pumping radiation 1 having a wavelength of 792 nm. This pumping radiation 1 is focused into lasant material 5 by a molded plastic or glass aspheric lens or gradient index lens 4. The lasant material 5 is in the form of a rod which has a length of about 3 to about 5 mm and is oriented for low threshold operation at a wavelength of 1047 nm. Input face 6 is polished convex with a radius of curvature equal to a few centimeters and a dielectric coating is applied to input face 6 which is highly reflective (greater than 99.9%) at a wavelength of 1047 nm and highly transparent (greater than 85%) at a wavelength of 792 nm. The output end 15 of lasant material 5 is polished flat and is antireflection coated with respect to radiation having a wavelength of 1047 nm. Bending mirror 7 is either flat or curved and carries a coating which is highly reflective (greater than 99.9%) at a wavelength of 1047 nm and highly transparent (greater than 90%) at a wavelength of 447 nm. Nonlinear optical material 8 is a rhombohedral prism of $KNbO_3$ which has a length of about 3 to about 5 mm and is cut so that the sum-frequency process can be phase-matched below the first phase transition temperature for $KNbO_3$ of 220° C. Internal face 16 of nonlinear optical material 8 is polished flat and antireflection coated for light of a wavelength of 1047 nm with the coating having the highest possible transparency at a wavelength of 447 nm. External surface 9 of nonlinear optical material 8 is polished flat and coated with a dielectric stack which is highly reflective (greater than 99.9%) at a wavelength of 1047 nm and highly transparent (greater than 85%) at a wavelength of 780 nm. Input radiation 10, which has a wavelength of 780 nm, is generated by a SHARP LT-024 single stripe index guided laser diode 12 having an output power in excess of about 20 mW. A lens system 13 transforms the astigmatic output 10 from laser diode 12 into a TEMoo gaussian mode. Finally, sum-frequency radiation 14, having a wavelength of 447 nm, is transmitted through bending mirror 7.

Figure 2:
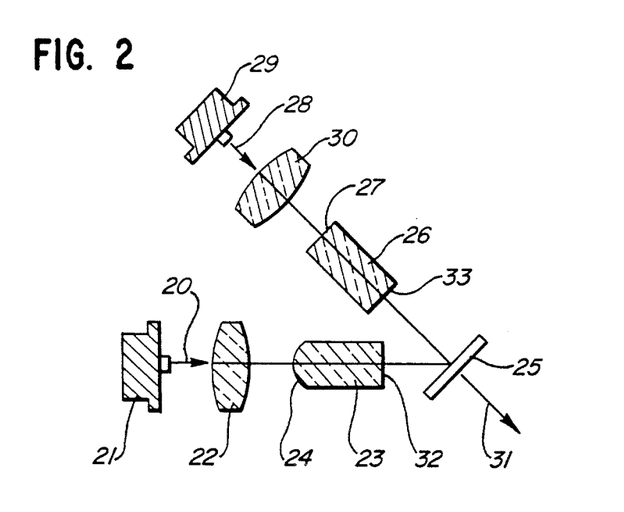
FIG. 2 of the drawings is a schematic representation of a second embodiment of the invention.

FIG. 2 schematically illustrates a second embodiment of the invention wherein the optical mixing output radiation strikes a bending mirror at near normal incidence. With reference to FIG. 2, radiation 20 from optical pumping means 21 is focused by lens 22 onto a rod of lasant material 23 which has a suitable reflective coating on convex surface 24 and is capable of being pumped by the light 20 from pumping means 21. Light emitted by the lasing of lasant material 23 is reflected off a suitable coating on bending mirror 25 and through a rhombohedral prism of nonlinear optical material 26 which has a suitable reflective coating on surface 27. Laser action by lasant material 23 occurs within the optical cavity which is formed by the reflective coatings on mirror 25 and surfaces 24 and 27. Coherent input radiation 28 from radiation source 29 is focused by lens 30 onto surface 27 of nonlinear optical material 26 in such a manner that the overlap between input radiation 28 and radiation generated by the lasing of lasant material 23 (cavity radiation) is maximized. Nonlinear optical material 26 is phase-matched for the desired optical mixing process between the input radiation 28 and the cavity radiation, and the resulting optical mixing radiation is passed through bending mirror 25 at near normal incidence as output radiation 31.

In the embodiment illustrated by FIG. 2, the external surface 24 of lasant material 23 is coated in such a manner that it is highly reflective for cavity radiation and substantially transparent to pumping radiation 20. Internal surface 32 of lasant material 23 is antireflection coated for cavity radiation. The reflective coating on bending mirror 25 is selected in such a manner that it is highly reflective for cavity radiation and substantially transparent to output radiation 31. External surface 27 of nonlinear optical material 26 is coated in such a manner that it is highly reflective for cavity radiation and substantially transparent to input radiation 28. Internal surface 33 of nonlinear optical material 26 is antireflection coated for cavity radiation with the coating having the highest possible transmission for output radiation 31.

FIG. 3 schematically illustrates a third embodiment of the invention wherein input radiation is injected into the optical cavity of the laser through a bending mirror and the optical mixing output radiation is removed through one end of the nonlinear optical material. With reference to FIG. 3, radiation 40 from optical pumping means 41 is focused by lens 42 onto a rod of lasant material 43 which has a suitable reflective coating on convex surface 44 and is capable of being pumped by the light 40 from pumping means 41. Light emitted by the lasing of lasant material 43 is reflected off a suitable coating on 90-degree bending mirror 45 and through a rod of nonlinear optical material 46 which has a suitable reflective coating on convex surface 47. Laser action by lasant material 43 occurs within the optical cavity which is formed by the reflective coatings on mirror 45 and surfaces 44 and 47. Coherent input radiation 48 from radiation source 49 is focused by lens 50 through 90-degree bending mirror 45 and onto surface 51 of nonlinear optical material 46 in such a way that the overlap between input radiation 48 and radiation generated by the lasing of lasant material 43 (cavity radiation) is maximized. Nonlinear optical material 46 is phase-matched for the desired optical mixing process between input radiation 48 and the cavity radiation, and the resulting optical mixing radiation 52 is passed through the reflective coating on surface 47 of nonlinear optical material 46.

In the embodiment illustrated by FIG. 3, external surface 44 of lasant material 43 is coated in such a manner that it is highly reflective for cavity radiation and substantially transparent to pumping radiation 40. Internal surface 53 of lasant material 43 is antireflection coated for cavity radiation. The reflective coating on 90-degree bending mirror 45 is selected in such a manner that it is highly reflective for cavity radiation and substantially transparent to input radiation 48. External surface 47 of nonlinear optical material 46 is coated in such a manner that it is highly reflective for cavity radiation and substantially transparent to output radiation 52. Internal surface 51 of nonlinear optical material 46 is antireflection coated for cavity radiation with the coating having the highest possible transmission for input radiation 48.

FIG. 4 schematically illustrates a fourth embodiment of the invention wherein input radiation is injected into the optical cavity of the laser by reflection off an angled face of the lasant material. With reference to FIG. 4, radiation 60 from optical pumping means 61 is focused by lens 62 onto a rod of lasant material 63 which has a suitable reflective coating on convex surface 64 and is capable of being pumped by the light 60 from pumping means 61. Light emitted by the lasing of lasant material 63 is passed into a rod of nonlinear optical material 65 which has a suitable reflective coating on convex surface 66. Laser action by lasant material 63 occurs within the optical cavity which is formed by the reflective coatings on surfaces 64 and 66. Coherent input radiation 67 from radiation source 68 is focused by lens 69 onto the angled face 70 of lasant material 63 from which it is reflected into nonlinear optical material 65 in such a way that the overlap between input radiation 67 and radiation generated by the lasing of lasant material 63 (cavity radiation) is maximized. Nonlinear optical material 65 is phase-matched for the desired optical mixing process between input radiation 67 and the cavity radiation, and the resulting optical mixing radiation 71 is passed through the reflective coating on surface 66 of nonlinear optical material 65. In this embodiment, external surface 64 of lasant material 53 is coated in such a manner that it is highly reflective for cavity radiation and substantially transparent to pumping radiation 60. Angled surface 70 of lasant material 63 has an antireflection coating for cavity radiation which also has the highest possible reflectivity for input radiation. External surface 66 and internal surface 72 of nonlinear optical material 65 carry coatings which are identical with those on surfaces 47 and 51, respectively, of FIG. 3.

We claim:

1. A method for generating coherent optical radiation which comprises:
    (a) generating coherent optical radiation of a first frequency, $w_1$, from a lasant material within an optical cavity;
    (b) generating coherent optical radiation of a second frequency, $w_2$, from a source which comprises a laser diode;
    (c) introducing said radiation of a second frequency into said optical cavity; and
    (d) interacting said radiation of a first frequency and said radiation of a second frequency with a nonlinear optical material within the optical cavity to generate coherent optical radiation of a third frequency, $w_3$.

2. The method of claim 1 wherein the source of said radiation of a second frequency comprises a laser diode array.

3. The method of claim 1 wherein $w_3 = w_1 + w_2$.

4. The method of claim 2 wherein $w_3$ is the difference between $w_1$ and $w_2$.

5. The method of claim 1 wherein said radiation of a first frequency is generated by optically pumping a solid lasant material.

6. The method of claim I wherein the optical pump for said solid lasant material comprises a laser diode.

7. The method of claim 6 wherein said optical pump comprises a laser diode array.

8. The method of claim 5 wherein said lasant material is comprised of neodymium-doped YAG.

9. The method of claim 1 which additionally comprises modulating said radiation of a third frequency by modulating said radiation of a second frequency.

10. The method of claim 1 which additionally comprises adjusting and controlling the polarization of said radiation of a first frequency and the polarization of said radiation of a second frequency to optimize the generation of said radiation of a third frequency.

11. The method of claim 1 wherein said nonlinear optical material comprises potassium titanyl phosphate.

12. A method for generating coherent optical radiation which comprises:
    (a) generating coherent optical radiation of a first frequency, $w_1$, from a lasant material within an optical cavity;
    (b) generating coherent optical radiation of a second frequency, $w_2$, from a source which comprises a diode-pumped solid state laser;
    (c) introducing said radiation of a second frequency into said optical cavity; and
    (d) interacting said radiation of a first frequency and said radiation of a second frequency with a nonlinear optical material within the optical cavity to generate coherent optical radiation of a third frequency, $w_3$.

13. The method of claim 12 wherein the source of said radiation of a second frequency comprises a diode-pumped frequency-doubled solid state laser.

14. A method for generating coherent optical radiation which comprises:
    (A) generating optical pumping radiation from a diode light source;
    (b) generating coherent optical radiation of a first frequency, $w_1$, by optically pumping a solid lasant material with said optical pumping radiation within an optical cavity;
    (c) generating coherent optical radiation of a second frequency, $w_2$;
    (d) introducing said radiation of a second frequency into said optical cavity; and
    (e) interacting said radiation of a first frequency and said radiation of a second frequency with a nonlinear optical material within the optical cavity to generate coherent optical radiation of a third frequency, $w_3$.

15. The method of claim 14 wherein said diode light source comprises a laser diode.

16. The method of claim 14 wherein said diode light source comprises a laser diode array.

17. The method of claim 14 wherein said diode light source comprises a light-emitting diode.

18. The method of claim 14 wherein $w_3 = w_1 + w_2$.

19. The method of claim 14 wherein $w_3$ is the difference between $w_1$ and $w_2$.

20. The method of claim 14 wherein said lasant material is comprised of neodymium-doped YAG.

21. The method of claim 14 which additionally comprise adjusting and controlling the polarization of said radiation of a first frequency and the polarization of said radiation of a second frequency to optimize the generation of said radiation of a third frequency.

22. The method of claim 51 wherein said nonlinear optical material comprises potassium titanyl phosphate.

23. An apparatus for generating coherent optical radiation which comprises:
    (a) means for generating coherent optical radiation of a first frequency, $w_1$, which comprises a lasant material within an optical cavity;
    (b) means for generating coherent optical radiation of a second frequency, $w_2$, which is outside of said optical cavity and comprises laser diode;
    (c) means for introducing said radiation of a second frequency into said optical cavity; and
    (d) nonlinear optical means within said optical cavity for interacting with said radiation of a first frequency and said radiation of a second frequency to generate coherent optical radiation of a third frequency, $w_3$.

24. The apparatus of claim 23 wherein said means for generating said radiation of a second frequency comprises a laser diode array.

25. The apparatus of claim 23 wherein $w_3 = w_1 + w_2$.

26. The apparatus of claim 23 wherein $w_3$ is the difference between $w_1$ and $w_2$.

27. The apparatus of claim 23 wherein said means for generating coherent optical radiation of a first frequency comprises an optically pumped solid lasant material.

28. The apparatus of claim 27 wherein the optical pump for said solid lasant material comprises a laser diode.

29. The apparatus of claim 28 wherein said optical pump comprises a laser diode array.

30. The apparatus of claim 29 wherein said lasant material is comprised of neodymium-doped YAG.

31. The apparatus of claim 23 which additionally comprises temperature control means for adjusting and controlling the temperature of said means for generating said radiation of a second frequency.

32. The apparatus of claim 23 which additionally comprises means for modulating said radiation of a second frequency.

33. The apparatus of claim 23 which additionally comprises polarization means for controlling the polarization of said radiation of a first frequency and the polarization of said radiation of a second frequency.

34. The apparatus of claim 23 wherein said nonlinear optical means is comprised of potassium titanyl phosphate.

35. An apparatus for generating coherent optical radiation which comprises:
(A) means for generating coherent optical radiation of a first frequency $w_1$, which comprises a lasant material within an optical cavity;
(b) means for generating coherent optical radiation of a second frequency, $w_2$, which is outside of said optical cavity and comprises a diode-pumped solid state laser;
(c) means for introducing said radiation of a second frequency into said optical cavity; and
(d) nonlinear optical means within said optical cavity for interacting with said radiation of a first frequency and said radiation of a second frequency to generate coherent optical radiation of a third frequency, $w_3$.

36. The apparatus of claim 35 wherein said means for generating said radiation of a second frequency comprises a diode-pumped frequency-doubled solid state laser.

37. An apparatus for generating coherent optical radiation which comprises:
(a) optical pumping means for generating optical pumping radiation which is comprised of a diode light source;
(b) solid lasant material within an optical cavity, wherein said lasant material is positioned to receive pumping radiation from said optical pumping means and is effective for producing coherent optical radiation of a first frequency, $w_1$, upon being pumped by the pumping radiation;
(c) means for generating coherent optical radiation of a second frequency, $w_2$, wherein said means for generating radiation of a second frequency is located outside of said optical cavity;
(d) means for introducing said radiation of a second frequency into said optical cavity; and
(e) nonlinear optical means within said optical cavity for interacting with said radiation of a first frequency and said radiation of a second frequency to generate coherent optical radiation of a third frequency, $w_3$.

38. The apparatus of claim 37 wherein said diode light source comprises a laser diode.

39. The apparatus of claim 37 wherein said diode light source comprises a laser diode array.

40. The apparatus of claim 37 wherein said diode light source comprises a light-emitting diode.

41. The apparatus of claim 37 wherein $w_3 = w_1 + w_2$.

42. The apparatus of claim 37 wherein $w_3$ is the difference between $w_1$ and $w_2$.

43. The apparatus of claim 37 wherein said lasant material is comprised of neodymium-doped YAG.

44. The apparatus of claim 37 which additionally comprises polarization means for controlling the polarization of said radiation of a first frequency and the polarization of said radiation of a second frequency.

45. The apparatus of claim 37 wherein said nonlinear optical means is comprised of potassium titanyl phosphate.

* * * * *

UNITED STATES PATENT OFFICE
CERTIFICATE OF CORRECTION

Patent No. 4,879,723  Dated November 7, 1989

Inventor(s) George J. Dixon, Douglas W. Anthon and John H. Clark

It is certified that error appears in the above-identified patent and that said Letters Patent is hereby corrected as shown below:

In the title, "OF OPTICAL MIXING" should read --BY OPTICAL MIXING--.

Column 6, line 26, "by 35 the" should read --by the--.

Claim 6, line 1, "claim I" should read --claim 5--.

Claim 14, line 3, "(A)" should read --(a)--.

Claim 22, line 1, "claim 51" should read --claim 14--.

Claim 30, line 1, "claim 29" should read --claim 27--.

Claim 35, line 3, "(A)" should read --(a)--.

Signed and Sealed this

Twenty-eighth Day of May, 1991

*Attest:*

HARRY F. MANBECK, JR.

*Attesting Officer*  *Commissioner of Patents and Trademarks*